United States Patent [19]

Richter et al.

[11] 4,427,910
[45] Jan. 24, 1984

[54] MAGNETIC SLOT WEDGE WITH LOW AVERAGE PERMEABILITY AND HIGH MECHANICAL STRENGTH

[75] Inventors: Eike Richter; Henry G. Lenz, both of Scotia, N.Y.

[73] Assignee: General Electric Company, Schenectady, N.Y.

[21] Appl. No.: 353,278

[22] Filed: Mar. 1, 1982

[51] Int. Cl.³ .............................................. H02K 3/48
[52] U.S. Cl. .................................... 310/214; 310/259
[58] Field of Search .............. 310/214, 215, 254, 259, 310/194

[56] References Cited

U.S. PATENT DOCUMENTS

| | | | |
|---|---|---|---|
| 871,758 | 11/1907 | Heitmann | 310/214 |
| 1,042,408 | 10/1918 | Dearborn | 310/214 |
| 1,710,931 | 6/1955 | Tittel | 310/214 |
| 2,386,673 | 10/1945 | Fisher | 310/214 |
| 2,451,633 | 10/1948 | Perrigo | 310/214 |
| 4,293,787 | 10/1981 | Motoya et al. | 310/181 |

FOREIGN PATENT DOCUMENTS

509823 10/1939 Fed. Rep. of Germany ...... 310/214
114638 of 1918 United Kingdom ................ 310/214

*Primary Examiner*—R. Skudy
*Attorney, Agent, or Firm*—William H. Steinberg; James C. Davis, Jr.; Marvin Snyder

[57] ABSTRACT

A magnetic wedge for use in toothed stators holds the stator windings in the slots formed between the teeth of the stator. The magnetic slot wedge comprises a nonmagnetic body, with a width corresponding to the width of the slot. The nonmagnetic body has parallel laminations of magnetic material extending part way through the width of the magnetic body from both sides of the magnetic body and perpendicular to the top surface. A central nonmagnetic region is thereby created with a region on either side of the central portion having an average permeability, along its length, substantially in the range of about 5–10.

2 Claims, 6 Drawing Figures

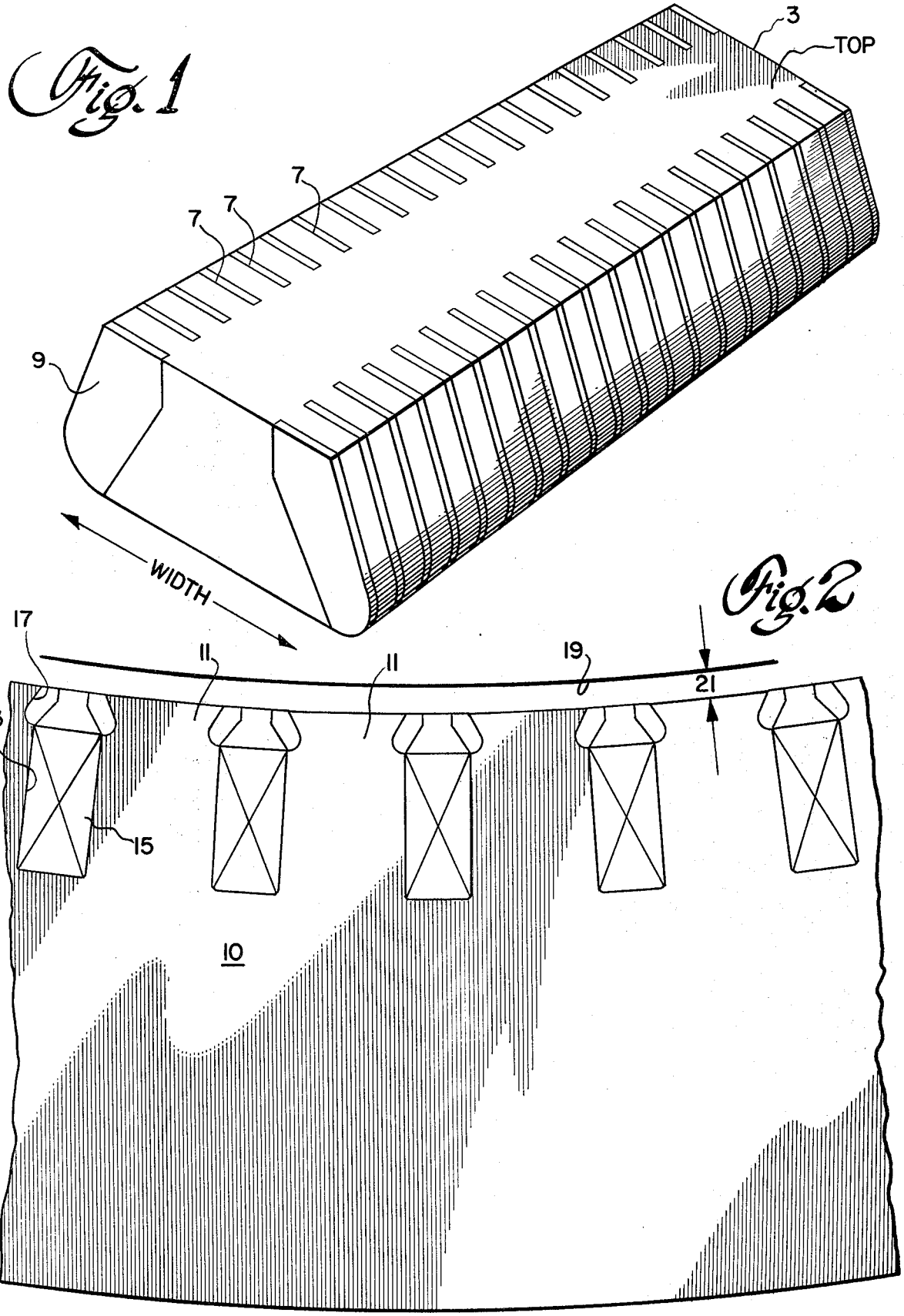

MAGNETIC SLOT WEDGE WITH LOW AVERAGE PERMEABILITY AND HIGH MECHANICAL STRENGTH

BACKGROUND OF THE INVENTION

This invention relates to AC machines and more particularly to slot wedges therefor, or top sticks as they are sometimes called.

In an AC machine having a toothed stator, slot wedges are used to hold the stator windings in the slots formed between the stator teeth. Slot wedges made of magnetic material are a significant means to improve the efficiency of an ac motor. Magnetic slot wedges reduce slot ripple in the air gap flux caused by the changing reluctance due to the slots, and also reduce the associated eddy current losses due to the interaction of the harmonics in the air gap flux with the conducting surface of the rotor. The magnetizing current required in the stator windings to generate the desired air gap flux is less with magnetic slot wedges, since more of the air gap flux is available for useful power production. However, closing the slot completely with magnetic material increases the leakage reactance of the motor, which in the case of an induction motor results in a reduction of power factor and of peak torque, and in a synchronous motor a reduction of peak torque and slower dynamic response.

The present methods of making magnetic slot wedges with wire or iron powder embedded in a carrier, generally do not allow easy shaping of the magnetic material in a way which reduces slotting harmonics or, as they are sometimes called, space harmonics, with a minimum increase in slot leakage reactance. Another problem is that attempts to manufacture magnetic slot wedges that are structurally sound and do not fail during operation have only been partially successful. Nonmagnetic slot wedges do not have the failure problems that magnetic slot wedges have. Thus, it is expected that the different magnetic forces, the different loss characteristics and the different thermal characteristics of the magnetic slot wedges are responsible for their limited life in actual operation.

To achieve reduced slot harmonic losses, stators with semiclosed slots have been used. Semiclosed slots, as the name implies, provide a narrow opening at the top of the slot and require random windings. Random windings are windings in which the relative position of one wire to another is not known until the wires are pushed through the narrow opening and pressed into the slot. Formed coil windings cannot be inserted into semi-closed slots. Formed coils are used for high voltage (above 600 volts) applications because of their superior turn and ground insulation properties and for larger machines (above 600 HP) because of their superior reliability, heat transfer capability and easy manufacturability in the larger coil sizes. When open slots are used in conjunction with magnetic slot wedges, formed coils can be used without sacrificing the advantages of semi-closed slots. In a formed coil the windings are preformed and the position of each wire relative to each of the other wires is known prior to insertion in the slot.

It is an object of the present invention to provide a magnetic slot wedge that results in reduced slot harmonic losses and sufficient strength to carry all the forces the wedge is exposed to.

It is a further object of the present invention to provide a magnetic slot wedge that results in reduced space harmonic losses and permits formed windings to be used.

It is a still further object of the present invention to provide a magnetic slot wedge which reduces the slotting harmonics with a minimum increase in slot leakage reactance.

SUMMARY OF THE INVENTION

In one aspect of the present invention a magnetic wedge is provided for use in a toothed stator. The magnetic wedges hold the stator windings in the slots formed between the teeth of the stator. The magnetic slot wedge comprises a nonmagnetic body with a width corresponding to the width of the slot. The nonmagnetic body has parallel laminations of magnetic material extending part way through the width of the magnetic body from both sides of the magnetic body and perpendicular to the top surface. A central nonmagnetic region is thereby created with a region on either side of the central portion having an average permeability along its length substantially in the range of about 5–10.

BRIEF DESCRIPTION OF THE DRAWING

While the specification concludes with claims particularly pointing out and distinctly claiming the present invention, the objects and advantages of the invention can be more readily ascertained from the following description of a preferred embodiment when used in conjunction with the accompanying drawing in which:

FIG. 1 is a perspective view of the magnetic slot wedge according to the present invention;

FIG. 2 is a section of a toothed stator core with the slot wedge of FIG. 1 positioned between the teeth;

DETAILED DESCRIPTION OF THE INVENTION

Figure 3:
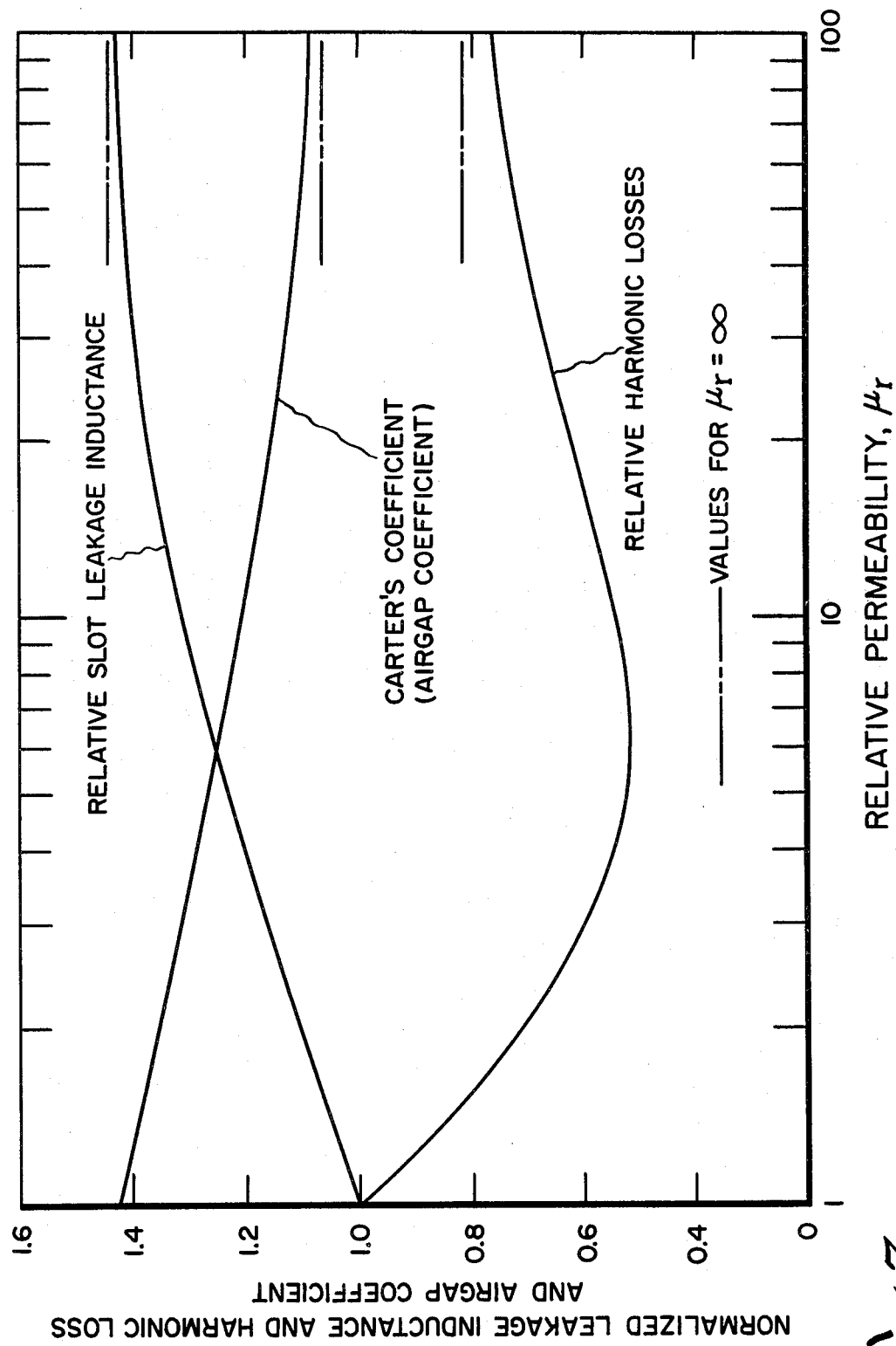
FIG. 3 is a graph showing the relationship among different values of permeability in the regions on either side of the central nonmagnetic region and harmonic losses, effective air gap and slot leakage reactance.

Referring now to the drawing wherein like numerals indicate like elements, there is shown in FIG. 1 a magnetic slot wedge 1. The magnetic slot wedge comprises a nonmagnetic body 3 of epoxy in a preferred embodiment but can alternatively be fabricated reinforced plastic or fiberglass. The width of the nonmagnetic body corresponds to the width of the slot in the stator into which the wedge is to be inserted. The nonmagnetic body 3 includes a plurality of parallel slits extending part way through its width from both sides, with the slits perpendicular to the top surface of the nonmagnetic body. The top surface of the nonmagnetic body is defined as that portion facing the air gap when the wedge is positioned in a slot of a toothed rotor. The slits 7 each have a lamination of magnetic material 9 such as silicon steel inserted in them. Alternatively, the laminations can be molded in place in the nonmagnetic body. The relative permeability of the central region of the width of the magnetic slot wedge is unity since it contains no magnetic material. The average permeability on either side of the central region is dependent on the stacking factor, which is determined by the distance between successive parallel laminations.

Referring now to FIG. 2, a portion of a laminated toothed stator core 10 is shown. Positioned between teeth 11 are slots 13. Formed windings 15 are in each slot. Near the open end of each slot on either side are notches 17 into which the magnetic slot wedges 1 are slid. The magnetic slot wedges extend the axial distance of the slot. The top of the magnetic slot wedges are flush with tops of the teeth 11. The outline of a rotor 19 is shown with the distance between the inside diameter of the stator and the outer surface of the rotor shown as 21, representing the air gap.

Investigations of the air gap field between the rotor and the stator in ac machines have shown that the harmonic content of the semiclosed slot is not as low as it could be. FIG. 3 shows that in a slot wedge geometry of the type shown in FIG. 1 the harmonic content of the air gap flux is a function of the average permeability of the regions on either side of the nonmagnetic central portion. It can also be seen in FIG. 3 that the value of permeability can be chosen to adjust the leakage reactance of the motor, the leakage reactance being slightly greater than the semiclosed slot configuration. A permeability of only approximately 5 is required for the particular geometry analyzed (the variable that would result in different permeabilities in different geometries is slot opening to air gap length which effects slot harmonic losses and leakage reactance) to obtain minimum slot harmonics. A permeability of 5 can be obtained by using magnetic laminations fabricated of 19 mil thick silicon steel separated by a nonmagnetic spacer three times the lamination thickness. In general, an average permeability substantially in the range of about 5 to 10 should be suitable for most configurations. The ratio of the radial thickness of the slot wedge to the slot opening influences leakage reactance, but not harmonic losses. The shape of the lamination also affects leakage reactance but not harmonic losses.

Figure 4:
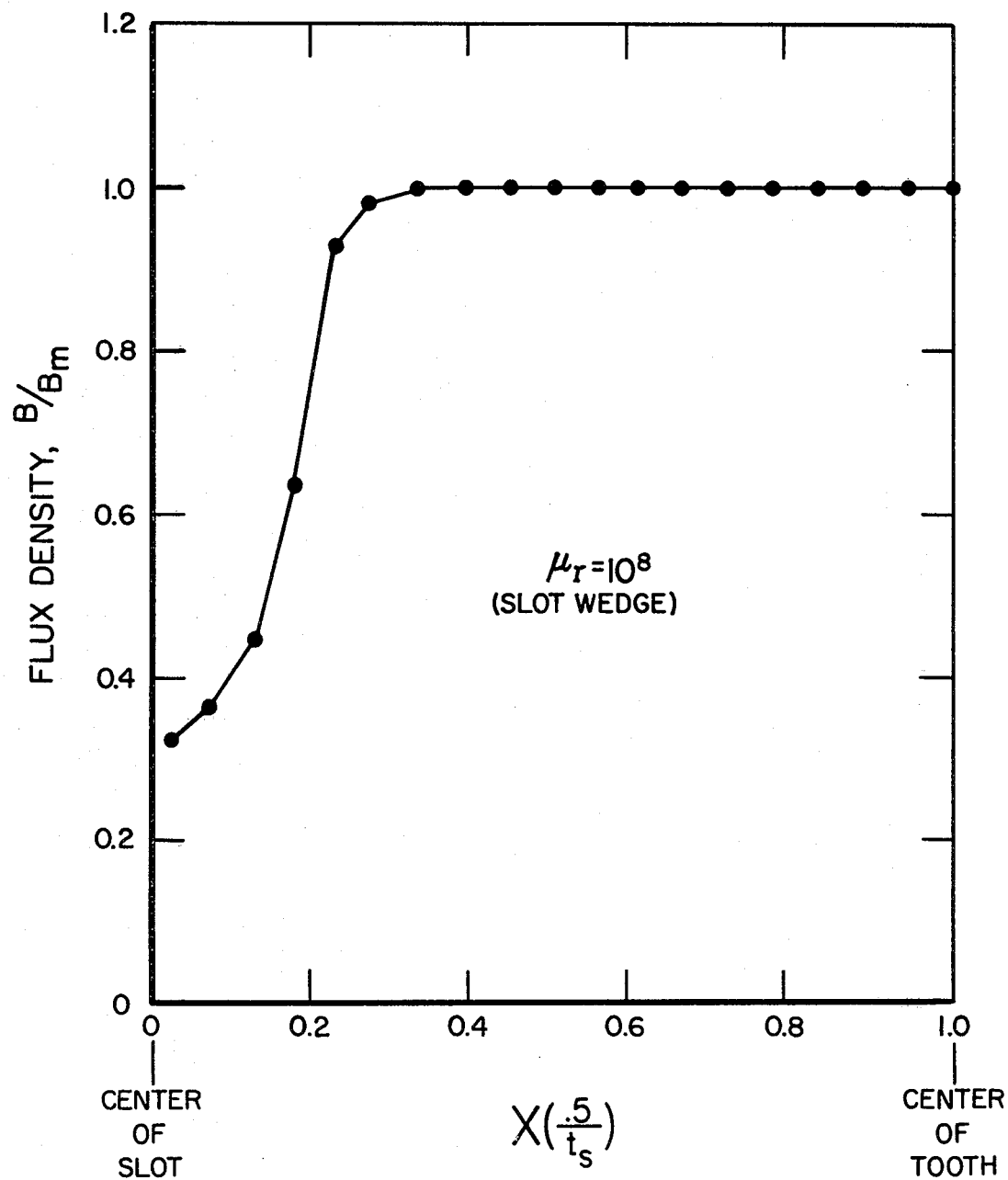
FIG. 4 is a graph showing the flux density in the air gap between the rotor and stator of a machine adjacent to a stator slot having a semiclosed slot wedge.
Figure 5:
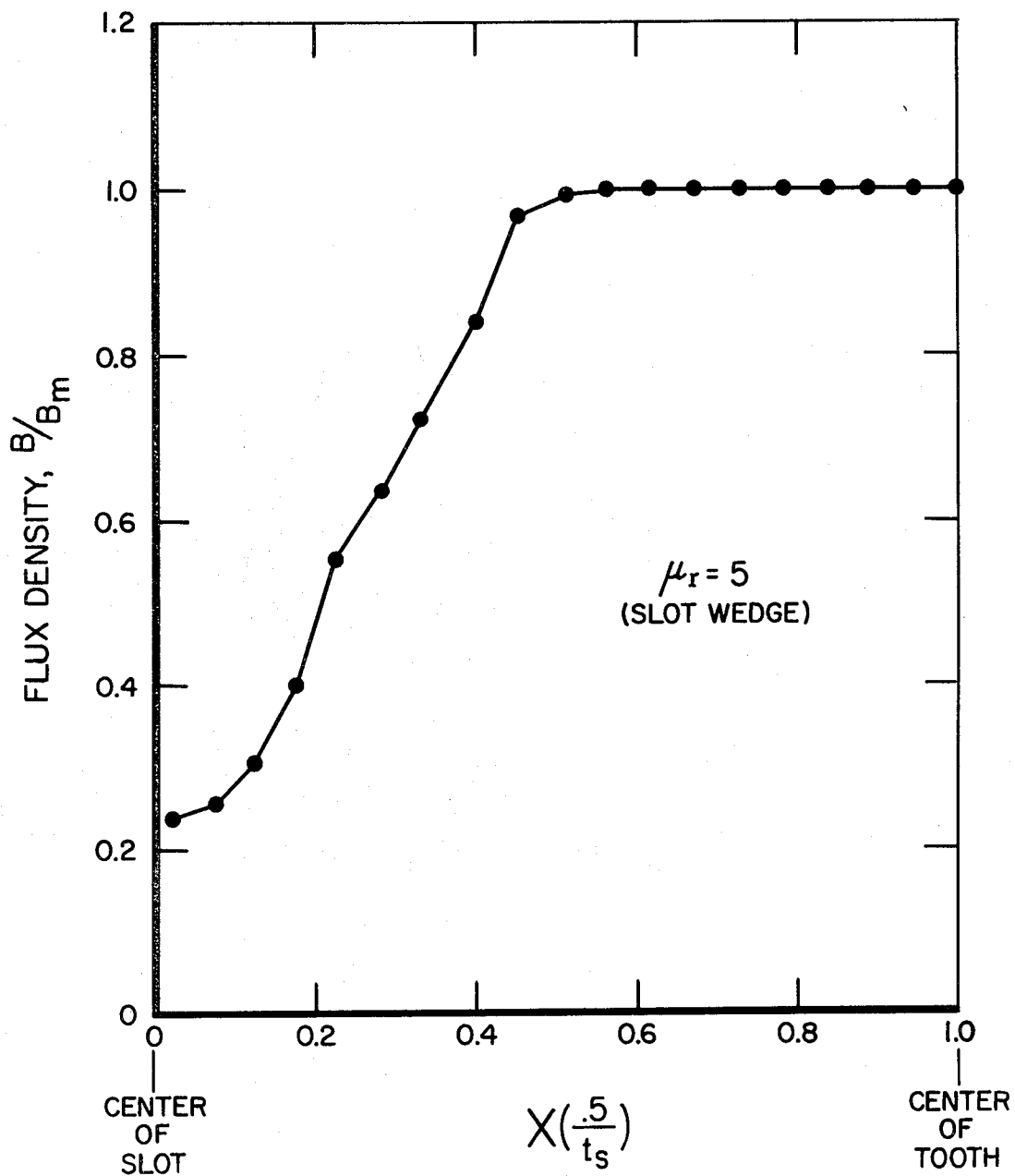
FIG. 5 is a graph showing the flux density in the air gap between the rotor and stator of a machine adjacent to a stator slot having a magnetic slot wedge which has an average permeability of ≈in the two regions on either side of a nonmagnetic central portion as in the present invention.
Figure 6:
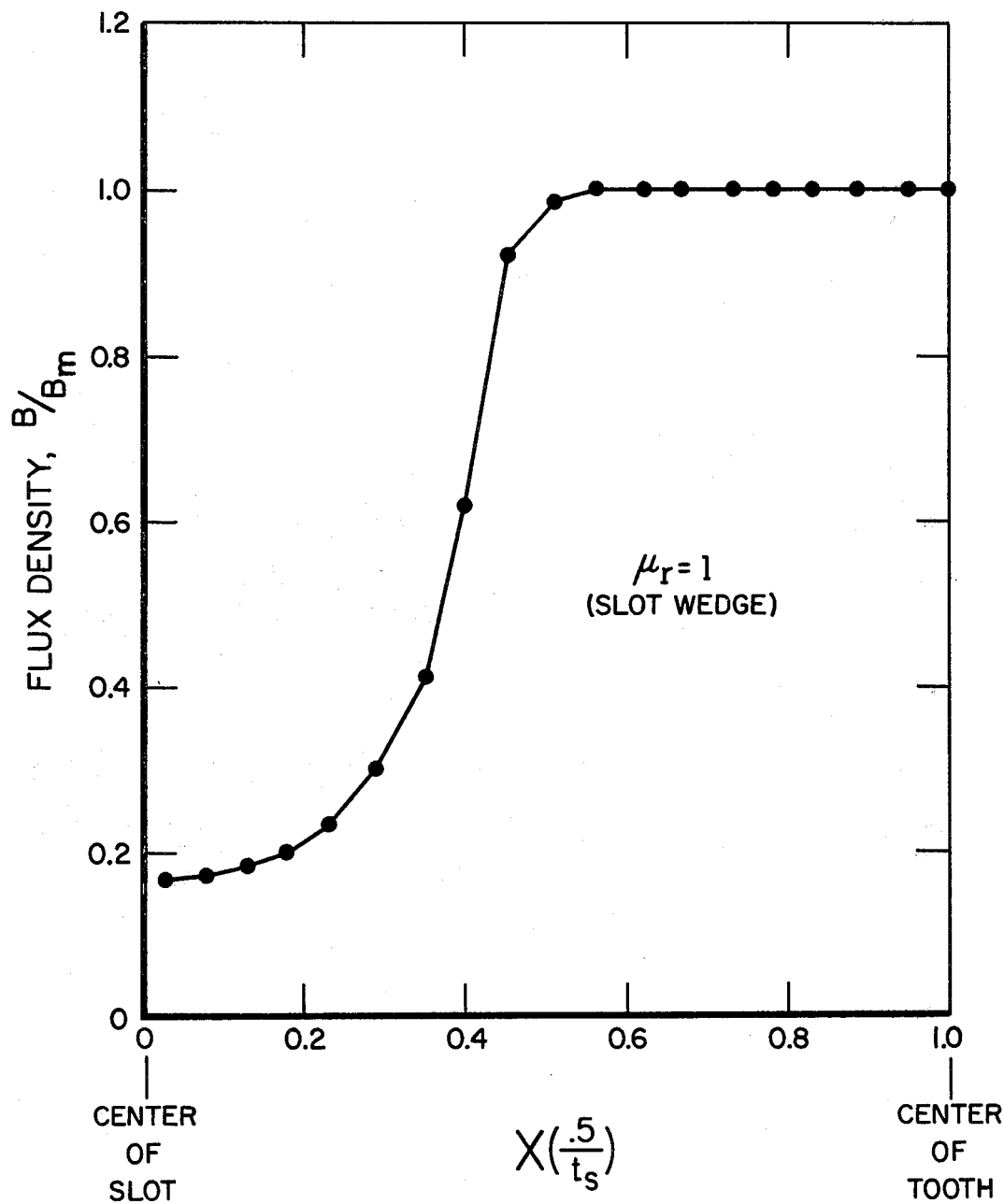
FIG. 6 is a graph showing the flux density in the air gap between the rotor and stator of a machine, adjacent to a stator slot having a nonmagnetic slot wedge.

In a semiclosed slot the average permeability is approximately 10,000 while a nonmagnetic slot wedge has a permeability of 1. FIGS. 4, 5 and 6 show the magnetic field in the air gap adjacent to a toothed stator having a semiclosed slot ($\mu_r = 10^8$), a magnetic slot wedge having an average permeability in each of the regions on either side of the nonmagnetic central portion of $\mu_r = 5$ and for a nonmagnetic slot wedge ($\mu_r = 1$). The ordinate in each of the graphs in the FIGS. 4, 5 and 6 indicates the relative flux density and the abscissa indicates the distance, with zero representing the center of the slot and one representing the center of the tooth. X represents the actual circumferential distance from the center of the slot and $t_s$ the slot pitch. X is divided by $t_s$, and multiplied by 0.5 to achieve a normalized value of 1 at the center of the tooth. In FIG. 4 a permeability of $10^8$ was used as an approximation of infinite permeability for the semiclosed slot, though actual permeability is approximately 10,000 in the semiclosed slot. By examining the flux curves of FIGS. 4, 5 and 6, it can be seen that the $\mu_r = 5$ case in FIG. 5 has the most gradual transition, and smallest rate of flux change with distance from the center of the slot, resulting in the lowest harmonic content. A Fourier analysis of the three curves would confirm this result.

Since the magnetic slot wedge fits into notches in the stator slot 17 of FIG. 2, formed windings can be used where required without the penalty of relatively high harmonic losses and can further provide the advantages of allowing greater slot fill and predetermined positioning between coil wires which is not possible if a semiclosed slot design is used.

The nonmagnetic body, which includes the spacers between the laminations, carries the mechanical load across the slot and insures that there are no interlaminator currents and losses in the slot wedge. The magnetic wedge of FIG. 1 appears from the air gap to be a wedge having a region of low permeability magnetic material on either side of a nonmagnetic central portion. The leakage reactance of the ac machine increases with decreasing width of the nonmagnetic central portion of the slot wedge. Slotting harmonic losses of the ac machine increase with increasing width of the nonmagnetic central portion of the slot wedge past the optimum permeability, which is substantially in the range of 5 to 10.

The foregoing describes a magnetic slot wedge that results in reduced slotting harmonic losses and sufficient strength to carry all the forces the wedge is exposed to. The magnetic slot wedge also permits the use of formed windings.

While the invention has been particularly shown and described with reference to a preferred embodiment thereof, it will be understood by those skilled in the art that various changes in form and details may be made therein without departing from the spirit and scope of the invention.

What is claimed is:

1. A slot wedge for use in a toothed stator of a rotary electric machine, successive teeth of said stator forming slots therebetween, said slot wedge comprising:
    a nonmagnetic body having a width corresponding to the width of any of said slots, said nonmagnetic body having a plurality of parallel slits extending part way through the width of said body from both sides, said slits extending perpendicular to the top surface of said nonmagnetic body; and
    a plurality of magnetic laminations, one lamination positioned in each of said slits, respectively.

2. A stator of a rotary electric machine comprising:
    a stator winding;
    a toothed stator core which successive teeth form slots therebetween, the stator winding positioned in said slots;
    a plurality of slot wedges positioned in said slots such that the tops of said wedges are flush with the ends of said teeth, each of said slot wedges comprising a nonmagnetic body with a length equal to the axial length of said stator core, and a width corresponding to the width of any of said slots, said nonmagnetic body having parallel slits extending part way through the body from both sides, the plane of each slit being perpendicular to the top of said body; and
    a plurality of laminations of magnetic material, each lamination positioned in a separate slit, respectively, of said nonmagnetic body.

* * * * *